United States Patent [19]

Walter

[11] 4,298,642
[45] Nov. 3, 1981

[54] SELF-ADHESIVE CROSSOVER FOIL OF METAL AND POLYESTER

[76] Inventor: John W. Walter, 511 Manhasset Woods Rd., Manhasset, N.Y. 11030

[21] Appl. No.: 35,579

[22] Filed: May 3, 1979

Related U.S. Application Data

[63] Continuation of Ser. No. 872,192, Jan. 25, 1978, abandoned.

[51] Int. Cl.³ .............................................. B32B 15/08
[52] U.S. Cl. ...................................... 428/40; 428/343; 428/352; 428/458; 428/480
[58] Field of Search .................. 339/17 F, 119, 278 D; 428/195, 215, 216, 343, 352, 854, 455, 38, 40, 458, 480

[56] References Cited

U.S. PATENT DOCUMENTS

| | | | |
|---|---|---|---|
| 2,735,970 | 2/1956 | Peck et al. | 428/458 X |
| 3,102,767 | 9/1963 | Schneck | 339/17 F |
| 3,524,921 | 8/1970 | Wolf | 339/17 F |
| 3,719,551 | 3/1973 | Radtke et al. | 428/458 X |
| 3,763,307 | 10/1973 | Wolf | 339/17 F X |
| 3,894,225 | 7/1975 | Chao | 339/17 F X |
| 4,054,348 | 10/1977 | Stroupe | 339/17 F X |
| 4,091,138 | 5/1978 | Takagi et al. | 428/458 X |

Primary Examiner—Marion McCamish
Attorney, Agent, or Firm—Allison C. Collard; Thomas M. Galgano

[57] ABSTRACT

A self-adhesive crossover foil for use in security alarm systems consisting of a lead conductor foil, a Mylar insulating foil, adhesively joined to one surface of the lead foil, the Mylar strip being at least as wide as the lead foil, and a pressure-sensitive adhesive, disposed on the exposed surface of the Mylar foil opposite the surface adjoining the insulator to the lead foil. The crossover foil additionally includes a release strip which is coupled to the pressure-sensitive adhesive. In a further embodiment, the Mylar insulating strip is substantially wider than the lead foil strip.

8 Claims, 5 Drawing Figures

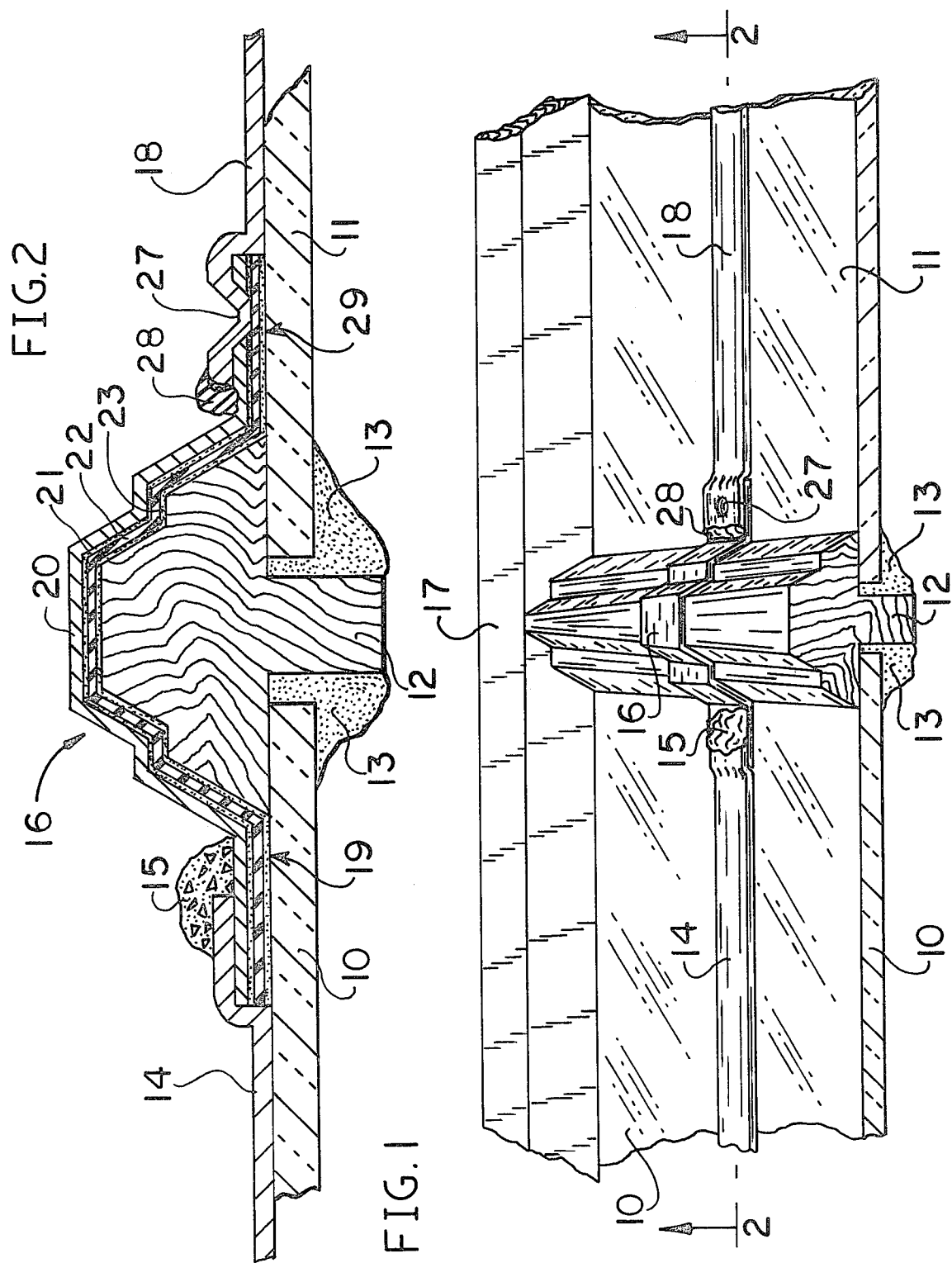

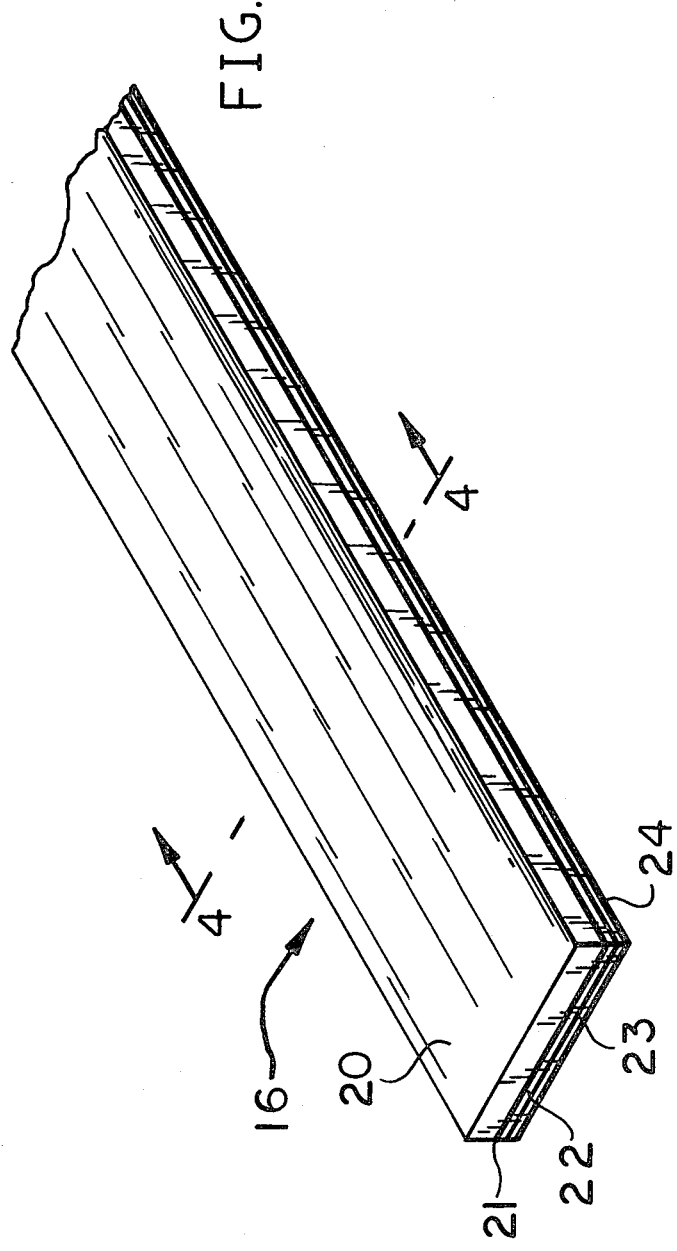

SELF-ADHESIVE CROSSOVER FOIL OF METAL AND POLYESTER

This invention relates to an improved, self-adhesive foil for use in intrusion alarm systems and the process for installing the same.

In the prior art systems, the process for the protection of window and wall areas required that a foil, usually of lead material, be connected across the window or wall area, up to the intersection of a window crossbar or mullion. When the crossbar is reached, an insulating material has to be placed on the crossbar so that the foil will not make electrical contact with the crossbar and short-circuit the electrical alarm system. In some cases, a brass shim is usually cut and contoured over the crossbar and insulated from the crossbar member, so as to interconnect foil pieces of adjacent window areas. The brass is then soldered to the ends of the foil of adjacent windows, to complete the electrical connection. This process has the disadvantage of being time consuming and thus costly for installations involving a large number of crossbar members.

Accordingly, the present invention provides an improved, self-adhesive crossover foil for making an interconnection between the ends of the window foils for adjacent windows. In the invention, the crossover foil is cemented to a Mylar sheet. The opposite surface of the Mylar sheet includes a pressure-sensitive adhesive for securing the combination of the foil and Mylar over the crossbar. The Mylar sheet provides not only an insulation between the foil and the crossbar but it also reinforces the foil, so as to make it tear-resistant. The ends of the crossover foil are then soldered, cemented, or electrically connected, by means of a perforating tool, to the ends of the window foil pieces to complete the electrical connection. The use of the invention self-adhesive crossover foil eliminates costly and unslightly foil blocks between panes of glass, and provides attractive, professional appearance, which conforms to the window mullion contours.

In one embodiment of the invention, the Mylar insulating film is the same width as the foil in the crossover piece. In another embodiment, the Mylar is made slightly wider than the foil, so as to prevent any accidental electrical contact to the crossbar, if the foil is nicked or elongated over the Mylar.

It is, therefore, an object of the present invention to provide a permanent self-adhesive crossover foil, which is simple in construction, inexpensive in cost and reliable in operation.

Other objects and features of the present invention will become apparent from the following detailed description considered in connection with the accompanying drawings, which disclose the embodiments of the invention. It is to be understood, however, that the drawings are designed for the purpose of illustration only, and not as a definition of the limits of the invention.

In the drawings, wherein similar reference characters denote similar elements throughout the several views:

FIG. 1 is a perspective view of a window area, showing a crossbar member and a crossover foil of the present invention interconnecting the window foils;

FIG. 2 is a cross-sectional view of FIG. 1, taken along Section 2—2;

FIG. 3 is a perspective view of a flattened piece of the crossover foil;

FIG. 4 is a cross-sectional view of FIG. 3, taken along Section 4—4; and

FIG. 5 is a cross-sectional view of a further embodiment of the crossover foil, according to the invention.

Referring to FIGS. 1 and 2, there is shown a typical installation of a crossover foil 16 for electrically interconnecting the ends of foils 14 and 18 of two adjacent window panes 10 and 11. In FIGS. 1 and 2, a lead foil 14, which is secured to the window surface, terminates adjacent to crossbar 12, so as not to make electrical contact with the crossbar. In this invention, the crossbar is shown constructed of wood, but could also be made of metal for casement windows. The crossbar is used to hold adjacent panes of glass and employs a window putty 13 between the crossbar and the edges of windows 10 and 11.

In the invention, a crossover foil 16, which will be described in more detail, is placed over the contours of crossbar 12, so that it extends along the edge of window panes 10 and 11, for approximately 1". Window foil 14 and adjacent foil 18 of window 11 are then terminated over the extending legs 19 and 29, so that electrical contact can be made. On the connection of leg 19 to foil 14, a liquid solder 15, consisting of a suspension of finely-divided metal particles in the form of a cement, is deposited so as to electrically join the two foils.

In another embodiment, foil leg 29 may be joined to the end of foil 18 by means of a solder connection 28, which can be performed by a soldering iron. It is also possible to join leg 29 to foil end 18 by means of making a perforation 27, using a perforating tool, so that the metal of both foils are compressed together, as shown in detail in FIG. 2.

Referring to FIGS. 3 and 4, there is shown a detailed view of the crossover foil according to the invention. The foil, which is enlarged and exaggerated in thickness for purposes of illustration, includes a flexible metal strip 20, preferably of lead, which is usually ¼" wide and 0.005" thick. Cemented by means of cement 21 to foil 20, is an insulator 22, preferably constructed of moisture-proof Mylar of 0.001" thick. The Mylar strip is the same width in FIG. 4 as the lead foil 20, and is coated with a pressure-sensitive adhesive 23 throughout its length. A release strip 24 is used to cover the adhesive area 23, and is generally peeled away when the crossover foil is to be used on a crossbar.

FIG. 5 shows another embodiment of the invention, wherein lead foil 30 is connected by means of cement 31, to a wider strip of insulating material 32, preferably constructed of moisture-proof Mylar (i.e., polyethylene terephthalate). A pressure-sensitive adhesive 33 is then deposited on the opposite surface of the Mylar, and a release strip 34 protects the adhesive until the crossover foil is ready to be used. In the embodiment of FIG. 5, lead foil 30 is preferably ¼" wide and 0.005" thick, and Mylar, with its adhesive-and-release strip, are preferably ½" wide. The Mylar is preferably 0.001" thick and will provide reasonably good insulation at moderate voltage levels. The embodiment of FIG. 5 has the advantage that small nicks made to the lead foil, will not be swaged over the thin Mylar insulator, to make accidental contact with the crossbar.

The crossover foil is preferably manufactured in elongated rolls and may be cut with ordinary scissors to the desired lengths for use. It can also be sold in pre-cut strips of 4, 5 and 6" lengths. The strips are temporarily joined together by a common backing strip, so that they can individually be peeled off from the same backing strip as they are used.

The cement holding foil 30 or 20 to Mylar strip 32 or 22, is preferably stronger than pressure-sensitive adhesive 33, so as to prevent a separation of the lead foil from the Mylar, when the crossover foil is applied to the crossbar. The use of Mylar adds not only flexibility and insulation to the crossover foil, but also improves its strength. The crossover of the invention could also employ other malleable metals, such as copper, tin or aluminum. The flexible, insulating or dielectric film could also be acetate, polyethylene or vinyl film, instead of Mylar.

While only a few embodiments of the present invention have been shown and described, it will be understood that many changes and modifications may be made thereunto, without departing from the spirit and scope of the invention.

What is claimed is:

1. In a security alarm system of the type which includes means for electrically interconnecting the ends of foils together on adjacent panes across a crossbar, the improvement comprising said means for electrically interconnecting comprising a self-adhesive crossover foil for attachment to the ends of said foils consisting of:
    an electrically-conductive strip of metal selected from the group consisting of lead, copper, tin and aluminum having first and second surfaces on opposite sides thereof, the first surface of which is exposed to air;
    an electrically-insulating strip of a material selected from the group consisting of polyethylene terephthalate, polyethylene, acetate and vinyl having first and second surfaces on opposite sides thereof, said first surface of which is joined to said second surface of said electrically-conductive strip, and said electrically-insulating strip being at least as wide as said electrically-conductive strip; and
    a pressure-sensitive adhesive disposed on said second surface of said electrically-insulating strip.

2. The crossover foil as recited in claim 1, wherein said first surface of said electrically-insulating strip is adhesively joined to said second surface of said electrically-conductive strip.

3. The crossover foil as recited in claim 1, wherein said electrically-insulating strip comprises moisture-proof polyethylene terephthalate.

4. The crossover foil as recited in claim 1, wherein said metal strip comprises a strip of lead foil.

5. The crossover foil as recited in claim 1, wherein said electrically-conductive strip comprises an elongated strip of lead foil and wherein said electrically-insulating strip comprises an elongated strip of moisture-proof polyethylene terephthalate, said strips of lead foil and said polyethylene terephthalate being about ¼" wide and said lead strip being about 0.005" thick and said polyethylene terephthalate strip being about 0.001" thick.

6. In security alarm system of the type which includes means for electrically interconnecting the ends of foils together on adjacent panes across a crossbar, the improvement comprising said means for electrically interconnecting comprising a self-adhesive crossover foil for attachment to the ends of said foils consisting of:
    an elongated strip of lead foil having first and second surfaces on opposite sides thereof, the first surface of which is exposed to air;
    an elongated strip of moisture-proof polyethylene terephthalate having first and second surfaces on opposite sides thereof, said first surface of which is adhesively joined to said second surface of said metal foil strip, and said polyethylene terephthalate strip being at least as wide as said metal foil strip;
    a pressure-sensitive adhesive, disposed on said second surface of said polyethylene terephthalate strip; and
    a release strip, releasably coupled to said pressure-sensitive adhesive.

7. The crossover foil as recited in claim 6, wherein said polyethylene terephthalate strip is substantially wider than said metal strip.

8. In a security alarm system of the type which includes means for electrically interconnecting the ends of foils together on adjacent panes across a crossbar, the improvement comprising said means for electrically interconnecting comprising a self-adhesive crossover foil for attachment to the ends of said foils consisting of:
    an electrically-conductive strip of metal selected from the group consisting of lead, copper, tin and aluminum having first and second surfaces on opposite sides thereof, the first surface of which is exposed to air;
    an electrically-insulating strip of a material selected from the group consisting of polyethylene terephthalate, polyethylene, acetate and vinyl having first and second surfaces on opposite sides thereof, said first surface of which is joined to said second surface of said electrically-conductive strip, and said electrically-insulating strip being at least as wide as said electrically-conductive strip;
    a pressure-sensitive adhesive, disposed on said second surface of said electrically-insulating strip; and
    a release strip releasably coupled to said pressure-sensitive adhesive.

* * * * *